United States Patent
Bastide et al.

(10) Patent No.: US 10,565,762 B2
(45) Date of Patent: Feb. 18, 2020

(54) MITIGATION OF BIAS IN DIGITAL REALITY SESSIONS

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Liam S. Harpur, Skerries (IE); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 15/846,315

(22) Filed: Dec. 19, 2017

(65) Prior Publication Data
US 2019/0188890 A1 Jun. 20, 2019

(51) Int. Cl.
  G06T 11/60 (2006.01)
  H04L 29/08 (2006.01)
  G06T 11/20 (2006.01)

(52) U.S. Cl.
  CPC .......... *G06T 11/60* (2013.01); *G06T 11/206* (2013.01); *H04L 67/22* (2013.01); *H04L 67/306* (2013.01)

(58) Field of Classification Search
  CPC .................. G06T 19/006; G06T 11/60
  See application file for complete search history.

(56) References Cited

U.S. PATENT DOCUMENTS

| | | | |
|---|---|---|---|
| 8,176,421 B2 | 5/2012 | Dawson et al. | |
| 9,117,193 B2 | 8/2015 | Brignull et al. | |
| 9,135,291 B2 | 9/2015 | Assam | |
| 9,288,616 B2 | 3/2016 | Cherry et al. | |
| 9,305,319 B2 | 4/2016 | Maor et al. | |
| 2007/0207789 A1* | 9/2007 | Zellner | G06Q 30/04 455/415 |
| 2010/0083139 A1 | 4/2010 | Dawson et al. | |
| 2014/0045532 A1* | 2/2014 | Fraccaroli | H04W 4/02 455/456.3 |

(Continued)

OTHER PUBLICATIONS

IBM, "Method for dynamic and aggregated user representations in virtual worlds", An IP.com Prior Art Database Technical Disclosure, Original Publication Date: Aug. 4, 2009, IP.com No. IPCOM000185981D, IP.com Electronic Publication Date: Aug. 4, 2009, 4 pages.

*Primary Examiner* — Jeffery A Brier
(74) *Attorney, Agent, or Firm* — Reza Sarbakhsh (57) ABSTRACT

Embodiments of the present invention disclose a method, computer program product, and system for identifying biases of one or more users during a shared augmented reality session and modifying the display. A first login is detected of an augmented reality. A first set of biases associated with the first user are generated. Visual data is received from a device associated with the first user profile. A masked overlay for display is generated and displayed to the first user based on the received visual data and the first set of biases. A second login of the augmented reality session is received. A second set of biases associated with the second login is generated. In response to analyzing a generated heat map, a positivity score is calculated. Changes are monitored for, in the first set of biases and second set of biases. The masked overlay is displayed.

18 Claims, 4 Drawing Sheets

(56) References Cited

U.S. PATENT DOCUMENTS

| | | | | |
|---|---|---|---|---|
| 2015/0095402 A1* | 4/2015 | Fraccaroli | ............... | H04W 4/02 |
| | | | | 709/202 |
| 2016/0026253 A1 | 1/2016 | Bradski et al. | | |
| 2016/0171514 A1* | 6/2016 | Frank | ................... | G06F 16/337 |
| | | | | 705/7.29 |
| 2016/0224803 A1* | 8/2016 | Frank | .................. | G06F 21/6245 |
| 2016/0300252 A1* | 10/2016 | Frank | ................. | G06Q 30/0203 |
| 2017/0031978 A1 | 2/2017 | Cunico et al. | | |
| 2017/0048337 A1* | 2/2017 | Fraccaroli | ............... | H04L 67/18 |

\* cited by examiner

MITIGATION OF BIAS IN DIGITAL REALITY SESSIONS

BACKGROUND

The present invention relates generally to the field of virtual reality devices and augmented reality devices, and more particularly to mitigating bias encountered during a virtual reality or augmented reality experience.

Augmented, virtual, or mixed reality systems, which may collectively be referred to as digital reality systems, are typically immersive experiences that isolate users of these systems from the outside or "real world" while using them. Users of social, or shared, digital reality systems, or sessions, enter with various biases based on their own real world experiences and social interactions. These social biases may become a driver in how each user interacts with others in the digital reality session. This will in turn have an impact on other user's likelihood of entering into, or reaming in, a specific narrative, or session based on these biases. Unfortunately, additional users must invest time engaging in a session before a determination can be made if the current session will be a positive or negative experience. It may be advantageous to have a mechanism to improve insight into what users biases are prior to direct digital reality engagement or a mechanism to minimize negative interactions between users of a shared digital reality session.

SUMMARY

Embodiments of the present invention disclose a method, computer program product, and system for identifying biases of one or more users during a shared augmented reality session and modifying the display associated with the one or more users of the augmented reality session to increase session time of the user's experience. A first login is detected of an augmented reality session associated with a first user profile of one or more user profiles. A first set of biases associated with the first user are generated, based on a first user profile. Visual data is received from a device associated with the first user profile. A masked overlay for display is generated to the first user based on the received visual data and the first set of biases. The masked overlay is displayed, wherein the masked overlay blocks portions of the augmented reality session associated with the first user based on the first set of biases. A second login of the augmented reality session associated with a second user profile of the one or more user profiles is received. A second set of biases associated with the second user is generated. A heat map is generating based on the first set of biases and the second set of biases. In response to analyzing the generated heat map, a positivity score is calculated. changes are monitored for, in the first set of biases and second set of biases. The masked overlay for display to the first user is modified based on the monitored changes in the first set of biases and second set of biases.

DETAILED DESCRIPTION

Embodiments of the present invention relate to the field of computer display devices and data analysis, and more particularly to virtual reality, augmented reality, and mixed reality, which may collectively be referred to as digital reality, input analysis in a social media context. The following described exemplary embodiments provide a system, method, and program product to, among other things, mitigate biases encountered during a digital reality experience or session based on social media metadata. Therefore, the present embodiment has the capacity to improve the technical field of digital reality devices by presenting the user with information to increase user participation through social media metadata analysis to avoid negative interactions during the digital reality session. The present embodiment has the capacity to improve the technical field of digital reality devices by modifying a digital reality device display to mitigate biases during a digital reality session.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Many wearable device vendors, such as Oculus Rift™ (Facebook™), Google Glasses™, and Samsung™ Virtual Reality are driving changes in user behavior. Real world, or traditional information, is increasingly being presented in combination with augmented/virtual reality, or digital reality, via, for example, games, overlaying map information, and manipulation of digital objects integrated with traditional reality. Digital reality's combination of live views with digital flags and markers enable information to be presented to a user, and allows or promotes user interaction. It should be appreciated that as digital reality device use increases, group user experiences, or social or shared digital reality interaction may also increase. As users interact with each other on digital reality platforms, natural social biases, influencing those interactions may result in positive or negative experiences for the users. It may be advantageous to have a mechanism to modify the digital reality session experience for a user to mitigate social biases of users that lead to negative interactions. It should be appreciated that all products and service names are trademarks of their respective owning entities.

Increased negative interactions may lead users to exit or abandon a digital reality session prematurely. It may also be advantageous to maximize users' digital reality experience. For example, a user engaged in a positive experience may have a longer digital reality session time compared to a user engaged in a digital reality session with more negative experiences. In a typical shared digital reality experience, users' interactions are subject to the biases and opinions of the other users. If users with conflicting biases interact, the negative interaction may cause users to exit or abandon a digital reality session prematurely decrease one or more user's digital reality session time.

For example, from the perspective of User A engaging in a digital reality session, User A may have an uncontrollable habit or physical characteristic that may cause User A to have social or psychological discomforts. User A may engage in digital reality to have interactions free of the habit or physical characteristic. For example, User A may use virtual avatars in a virtual reality session or digital overlays, digital masks, or digital costumes and the like, in an augmented reality session to hide a perceived socially uncomfortable habit or characteristic. During such digital reality sessions, User A may encounter, or interact with User B. User B may display, mention, tag, or otherwise communicate, knowingly or unknowingly, gestures, auditory interactions, or visual interactions, which offend User A. These offensive interactions, or negative interactions, may engage the habit or physical characteristic User A was attempting to disengage from by joining the digital reality session. Due to this negative interaction, and the social discomfort, User A may exit the digital reality session sooner than they would have otherwise.

It may be advantageous to modify a user's digital reality session based on their social media interactions and historical interactions during past digital reality sessions. Doing so would improve the user's digital reality experience overall, and encourage continued use of digital reality services.

The present invention relates generally to the field of virtual reality devices and augmented reality devices, and more particularly to mitigate bias encountered during a virtual reality or augmented reality experience. Mitigating bias encountered during a virtual reality or augmented reality experience may include modifying a user's digital reality session based on their social media interactions and their digital reality history. Embodiments by which bias mitigation application 111 mitigates bias encountered during a digital reality is described in detailed below by referring to the accompanying drawings in FIGS. 1-4.

Figure 1:
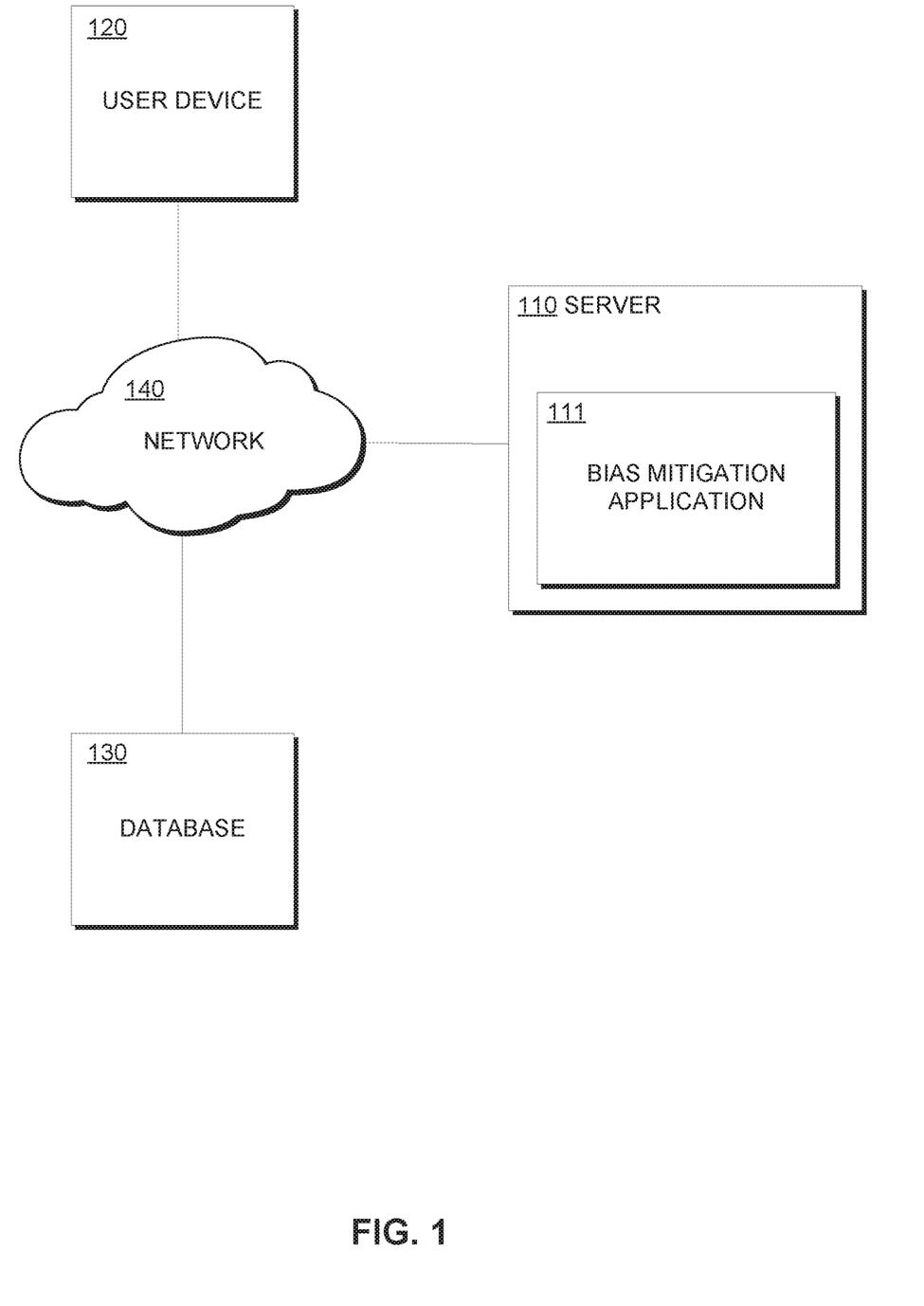
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. Distributed data processing environment 100 includes server 10, user device 120, and database 130, all interconnected via network 140.

Server 110, user device 120, and database 130 may be a laptop computer, tablet computer, netbook computer, personal computer (PC), a desktop computer, a smart phone, or any programmable electronic device capable of communicating via network, for example, network 130 and with various components and devices within distributed data processing environment 100. Server 110 includes social vaccination application 111. Social vaccination application 111 may communicate with user device 120 and provide an audio or visual overlay to the augmented reality or virtual reality experience of the user. Server 110, user device 120, and database 130 may include internal and external hardware components, as depicted and described in further detail with respect to FIG. 5.

The user device 120 may be any programmable electronic device capable of display where the display is capable of providing a digital reality experience for the user. For example, the user device 120 may include, among other things, a virtual reality headset that provides a virtual reality experience for the wearer. Virtual reality headsets are widely used with computer games but they are also used in other applications, including simulators and trainers. They include a stereoscopic head-mounted display (providing separate images for each eye), stereo sound, and head motion tracking sensors (which may include gyroscopes, accelerometers, structured light systems, cameras, etc.). Some virtual reality headsets also have eye tracking sensors and gaming controllers.

The user device 120 may also be an augmented reality device. Augmented reality is a live direct or indirect view of a physical, real-world environment whose elements are augmented by computer-generated sensory input such as sound, video, graphics or Global Positioning System data. It is related to a more general concept called computer-mediated reality, in which a view of reality is modified (possibly even diminished rather than augmented) by a computer. Augmented reality enhances one's current perception of reality, whereas in contrast, virtual reality replaces the real world with a simulated one. Augmentation techniques are typically performed in real time and in semantic context with environmental elements, such as overlaying supplemental information like scores over a live video feed of a sporting event. Like above, both virtual reality devices and augmented reality devices may be referred to collectively as digital reality devices for purposes of the following description.

It should be appreciated that user device 120 may be any programmable electronic device capable of conveying real world environments, completely virtual environments, or augmented reality environments.

Database 130 may act generally to perform datamining on social media websites to determine biases or norms associated with various users of the social media platform. Database 130 may be any database, server, or data storage medium that is capable of communication with server 110 and user device 120 via network 130. Database 130 may also datamine social behavior statistics related to various activities that take place in the real world that conform to social norms of a geographic area. For example, a hand gesture may indicate a greeting in a geographic area but the same hand gesture may convey an obscenity in another geographic area. It should be appreciated that the function of database 130 may be performed in a datastore within server 110 or user device 120, in various embodiments of the present invention.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server 110 and user device 120 along with any other components in distributed data processing environment 100.

In an embodiment, the user device 120 may operate as a digital reality display device while the bias mitigation application 111 may run primarily on the server 110. In an alternative embodiment, the bias mitigation application 111 may run primarily on the user device 120 while the server 110 may be used for processing and storage of data used by the bias mitigation application 111. It should be noted that the bias mitigation application 111 may be a standalone program or may be integrated into a larger application.

It should also be noted, that processing for the bias mitigation application 111 may be shared amongst the user device 120 and the server 110 in any ratio. In another embodiment, the bias mitigation application 111 may operate on more than one server, user device, or some combination of servers and user devices, for example, a plurality of user devices 120 communicating across the network 130 with a single server 110. In another embodiment, for example, the bias mitigation application 111 may operate on a plurality of servers 110 communicating across the network 130 with a plurality of user devices 120. Alternatively, the bias mitigation application 111 may operate on a network server communicating across the network with a server 110 and one or more user devices 120.

In various embodiments of the present invention, bias mitigation application 111 may act generally to leverage social interactions of users on social media platforms to determine user's biases based on social media characterizes, for example, opinions, preferences, political associations, and/or geographic customs. Bias mitigation application 111 may monitor users digital reality session interactions, and modify the digital reality session bases on users biases to avoid negative interaction, or interactions between users of differing biases. By bias mitigation application 111 limiting negative interactions, bias mitigation application 111 may maximize the users' digital realty session experience, which may be measured, for example, via a use time value. In various embodiments, bias mitigation application 111 may label associated objects in the digital reality session with bias indicators, generate a heat map of the labeled objects, and generate a modified visual display of the digital reality session based on the bias indicators of objects within the session.

In various embodiments, bias mitigation application 111 may receive and analyze behavioral data associated with social norms from a predetermined database, corpus, or from aggregated interactions on social media platforms, for example, via database 130. Bias mitigation application 111 may also generate social biases based on the received behavioral or social media data. Specifically, bias mitigation application 111 may extract and analyze social media inputs associated with a user identification to categorize and associate biases with a user profile. In various embodiments, bias mitigation application 111 may revive a digital reality session start command from a user device, for example user device 120. The received start command may include an associated user login or profile data. Bias mitigation application 111 may query a social media database, for example database 130, for social media data associated with the user login or profile data. Bias mitigation application 111 may extract biases or characteristics of the user that have a probability of conflicting with characteristics or biases of other users in the digital reality session associated with the digital reality start command. Conflicting biases may have a negative impact on the user's digital reality session and be associated with a negative bias value or label. When a digital reality session is generated, bias mitigation application 111 may analyze the display outputs of the digital reality session and label the objects within the digital reality session. Bias mitigation application 111 may analyze the biases of all the users within the digital reality session and label objects or interactions as conflicting with the user's biases or not. Bias mitigation application 111 may generate blocks, filters, or masks to overlay on the digital reality display to modify objects within the digital reality session that have a probability above a threshold of conflicting with the user's biases that may cause the user negative experience. Therefore, by modifying the digital reality session environment conflicting biases may be avoided and increase the session time of the user.

In various embodiments, a user may engage in a social digital reality experience or shared digital reality session. Bias mitigation application 111 may monitor the inputs of other users engaged in the shared digital reality session. Bias mitigation application 111 may determine and aggregate the possible interactions the user may engage in with other users in the shared digital reality session. Bias mitigation application 111 may generate a heat map based on the various possible interactions of the multiple users and the probability that an interaction may result in a negative association for the user. In various embodiments, the generated heat map may include a visualization of interactions, represented by data points, and a gradient in between data points based on the relative associated positive or negative probability values. Bias mitigation application 111 may analyze the heat map to determine the combinations the situational modifications that can be introduced into the shared digital reality session that will have the highest probability of a positive association with the user and the interaction.

Figure 2:
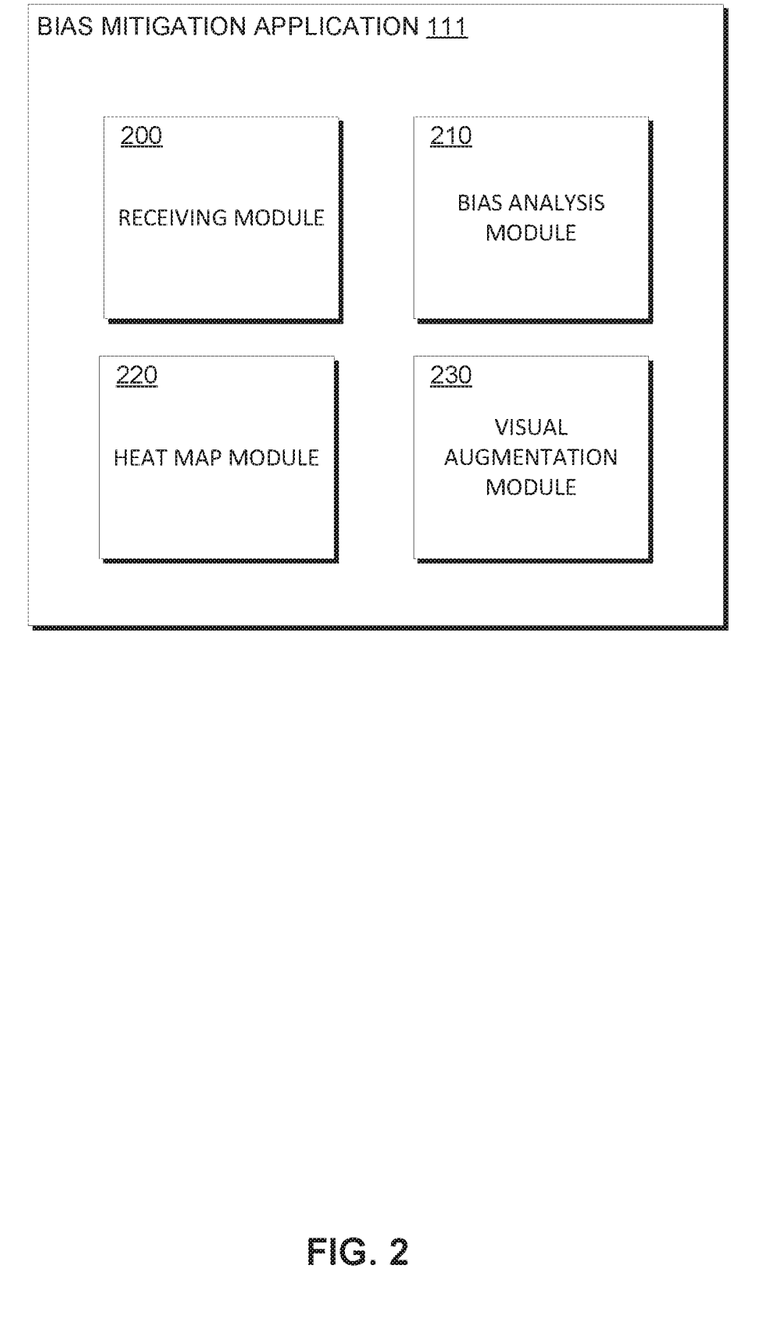
FIG. 2 is a functional block diagram illustrating the components of an application within the distributed data processing environment, in accordance with an embodiment of the present invention.

FIG. 2 is a functional block diagram illustrating the components of an application, for example, model performance application 111, within server 110, within the distributed data processing environment 100, in accordance with an embodiment of the present invention. Bias mitigation application 111 includes receiving module 200, bias analysis module 210, heat map module 220, and visual augmentation module 230.

In an embodiment, receiving module 200 receives a request to start a digital reality session with biases mitigation. The received request may include social media login information or an identification associated with a social media account. In various embodiments, receiving module 200 may query a social media website or social media database, for example, database 130 for social media metadata. In various embodiments, bias application 111 may be integrated into digital reality software and may be executed in parallel with digital reality software.

In an embodiment, receiving module 200 receives social media data associated with the user associated with the request that includes at least social media metadata including at least a set of geographic data associated with the user. The set of geographical data may include data received from a Global Positioning System on the user device 120 or on another device associated with the user's location. The set of social media metadata may further include data associated with login credentials associated with user input or a user profile. In various embodiments, the set of social media data may be data-mined from one or more social media websites, for example, by database 130 or user device 120. Receiving module 200 may communicate the social media data and associated user identification to bias analysis module 210.

In an embodiment, bias analysis module 210 receives social media data and a corresponding user profile identification from receiving module 200. Bias analysis module 210 may analyze social media data associated with the user and the user's profile information to determine the user's social media characteristics. In general, according to various embodiments, a user's social media characteristics are derived directly from the user's profile and their social media activity. For example, political affiliation or geographic location may be derived from the user's social media profile, while a user's social opinions, political opinions preferences, and/or geographic customs may be derived from the user's social media activity, such as, for example, mentions, tags, hashtags, likes, dislikes, etc. Alternatively, according to various embodiments, a user's social media characteristics are derived from the social media activity of their friends or followers. For example, opinions, preferences, political associations, and geographic customs may be derived from mentions, tags, hashtags, likes, dislikes by the user's friends or followers. Finally, according to various embodiments, the social media data received by the bias analysis module 210 may include historical social media data from which the user's social media characteristics are derived.

In an embodiment, bias analysis module 210 detects the start of a digital reality session associated with the user or user profile. Bias analysis module 210 may determine if the user engaging in the digital reality session will have any interactions associated with one or more of the user characteristics. Bias analysis module 210 may label objects in the digital reality session associated with user interactions, for example, objects of the digital reality background environment or objects associated with other users or user avatars. For example, User A starts a digital reality session. Recently User A had a boat accident and posted about the incident on a social media website. Bias analysis module 210 may determine that one object User A may interact with is a digital lake artifact within the digital reality environment, and label the digital lake artifact as a possible negative interaction. Bias analysis module 210 may determine that User A may interact with is a sailor avatar of User B, labeling the avatar of User B a possible negative interaction. Bias analysis module 210 may communicate user characteristics and labeled objects to heat map module 220.

In an embodiment, heat map module 220 receives user characteristics and labeled objects from bias analysis module 210. In an embodiment, heat map module 220 generates a heat map, specific to an individual user, based on the received user characteristics and labeled objects.

The generated heat map may represent a point in time construct of all the possible interactions a user can have, with objects or other users, in the digital reality session. The heat map may further indicate the impact, whether positive or negative, the interaction may have on the user's digital reality experience. Each possible interaction identified on the heat map is assigned a weight by heat map module 220. The weight value indicates whether the interaction is determined to be positive or negative and to what degree. For example, according to an embodiment, a positive weight value indicates a particular interaction is considered/determined by heat map module 220 to be a positive interaction, and a negative weight value indicates a particular interaction is considered/determined by heat map module 220 to be a negative interaction. Additionally, a higher weight value may represent the confidence of the determination by the heat map module 220 that a particular interaction is either positive or negative.

The weight value assigned to a particular interaction is based on the user characteristics and positive or negative associations with the user characteristics based on the social media data. Heat map module 220 may communicate the generated heat map to visual augmentation module 230.

In an embodiment, visual augmentation module 230 receives the generated heat map from heat map module 220. In various embodiments, visual augmentation module 230 will modify the digital reality session based on the heat map to eliminate, or at least minimize, negative interactions determined by an analysis of the received heatmap. Doing so will enhance the user experience and encourage continued participation in the digital reality session. According to various embodiment, visual augmentation module 230 modifies the digital reality session by modifying what is displayed to the user during the digital reality session. Modifying the display may include, for example, applying a rendered digital overlay to change the visual display of the user. For example, in an additional embodiment, visual augmentation module 230 may generate blocks or masks that represent modifications to objects within the digital reality display determined by the heat map module 220 to incite a positive interaction. Visual augmentation module 230 will overlay the generated blocks or masks onto the digital reality session display to obfuscate or effectively replace the original object believed to incite a negative interaction. For example, it may be determined from User A's social media that any interaction with spiders may be negative, visual augmentation module 230 may generate a digitally rendered object that looks like a mouse such that any digital spider looking objects in the digital reality session within the field of view of User A will be modified to look like mice. In various embodiments, visual augmentation module 230 continuously monitors changes in the digital reality display and any response to the modifications based on user input. Visual augmentation module 230 may communicate changes to heat map module 220. Visual augmentation module 230 may update the modifications based on an updated heat map generated by heat map 220, in response to receiving changes from visual augmentation module 230.

Figure 3:
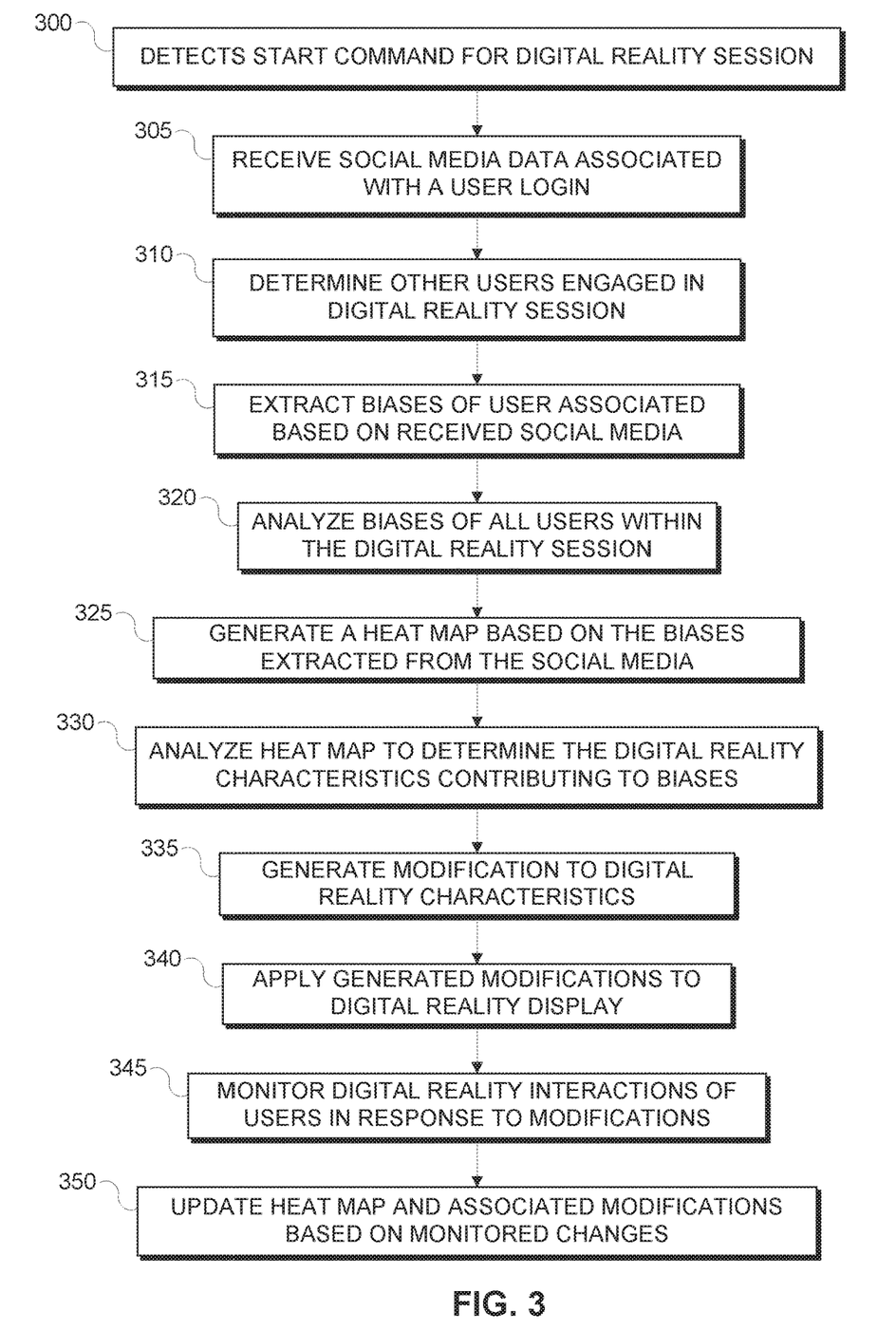
FIG. 3 is a flowchart depicting operational steps of an application, on a server computer within the data processing environment of FIG. 1, in accordance with an embodiment of the present invention.

FIG. 3 is a flowchart depicting operational steps of bias mitigation application 111, on server 110 within data processing environment 100 of FIG. 1, in accordance with an embodiment of the present invention. Receiving module 200 detects a start command for a digital reality session associated with a user identification (block 300). Receiving module 200 receives social media data associated with the user identification (block 305) from a datastore, for example, database 130. Receiving module 200 determines the number of other users engaged in the same digital reality session (block 310), identifies the users and queries a datastore for associated social media data. Receiving module 200 communicates the user identifications and associated social media data to bias analysis module 210.

Bias analysis module 210 analyzes the received social media data and extracts biases based on the received social media data (block 315) for each associated user engaged in the digital reality session. In various embodiments, bias analysis module 210 determines what objects or interactions within the digital reality session would trigger a biased reaction or negative experience for the user associated with the start command, and associated those objects with labels representing potential biased or negative interactions. Bias analysis module 210 communicates the determines biases and associated users to heat map module 220.

Heat map module 220 analyzes the received biases and associated user identifications (block 320) to generate a heat map (block 325). The generated heat map includes all biases from all users engages in the digital reality session. In various embodiments, the generated heat map may include points with associated values within a range, for example, from −1 to 1, that represent the positive or negative weight associated with the object or interaction at that point.

Heat map module 220 analyzes the generated heat map to determine the objects or interactions that would most likely contribute to a negative experience for the user associated with the start command (block 330). Heat map module 220 communicates an aggregated list of objects or interactions and the associated heat map location to visual augmentation module 230.

Visual augmentation module 230 generates modifications to digital reality objects or interactions based on the received list of objects or interactions and associated heat map (block 335). In various embodiments, visual augmentation module 230 may make visual or auditory modifications, for example, blacking out an object, overlaying a modified texture or mask on an object, or muting or applying a modification to an audio output. Visual augmentation module 230 applies the generated modifications to the visual output of the digital reality session (block 340), for example, the generated modifications of objects associated with biases of a user will be applied to the display and audio outputs of a digital reality device associated with the user.

Visual augmentation module 230 monitors the digital reality session for changes in the objects or interactions, in response to the modifications (block 345). In various embodiments, visual augmentation module 230 communicates any monitored changes in the digital reality session to heat map module 220. Heat map module 220 may modify the generated heat map and visual augmentation module 230 may generate additional modifications based on the modified generated heat map (block 350).

Various Examples

In various embodiments, bias mitigation application 111 may leverage an avatar in a virtual reality environment. For example, User B has an avatar that includes an Image C that User A has mentioned in a social media post with a negative or inappropriate context. Bias mitigation application 111 may receive a start command for a shared virtual reality session associated with User A. Bias mitigation application 111 may receive the social media data associated with User A. Bias mitigation application 111 may determine that one of a plurality of biases associated with User A, based on the analyzed social media data is a bias against or negative associate with Image C. Bias mitigation application 111 may determine an object in the virtual reality session shared by User A and User B is Image C on User B's avatar. Bias mitigation application 111 may generate a mask overlay modifying or blocking Image C whenever the avatar of User B is within the display range or field of view of User A. In various embodiments, a mask overlay may be a visual augmentation, shading augmentation, object highlight, object label, or any modification to the display of a user. In various embodiments, if User B executes the virtual reality session first, bias mitigation application 111 may display a warning message to User A when User A executes the virtual reality session. In various embodiments, if User A executes the virtual reality session before User B, bias mitigation application 111 may display a warning message as User B is approaching and wait for a user input confirmation to modify Image C.

In an exemplary embodiment, a user, for example, User A executes an augmented reality session at a café while watching a sports contest for additional information on the sports contest. When User A executes the augmented reality session, bias mitigation application 111 may receive social media data associated with User A. Bias mitigation application 111 may determine via an analysis of the social media data that User A has a bias or negative association with Political Figure Bob. During a commercial segment of the sports contest a televised advertisement featuring Political Figure Bob is being displayed on the television. Bias mitigation application 111 may analyze the images on the television as objects within the augmented reality space and may generate an overlay to replace the television image associated Political Figure Bob with an image related to the sports contest.

In an additional exemplary embodiment, bias mitigation application 111 may be within a digital reality device and leveraged as a parental control mechanism. When a digital reality session is executed bias mitigation application 111 may receive a user identification for a minor. Bias mitigation application 111 may generate mask overlays to minimize predetermined age inappropriate content, for example, replacing alcoholic cans with soft drink cans in a lifestyle simulator game or reduce blood content in a fighting game or first person shooter. There may be advantages to developers to provide games to the widest possible audience without needing to anticipate changes in content for different age groups.

In various embodiments, bias mitigation application 111 may receive geographic data, for example, via a global positioning system on user device 130, and query a database on cultural norms associated with that geographical location. For example, if User A is in a shared digital reality first person shooter and encounters a teammate User B. User A may engage in a hand wave to indicate a salutation, as is the social norm for User A's geographical location. User B may be in a geographical location in which a hand wave conveys an insult or profanity. Bias mitigation application 111 may receive geographic data for User B, and generate a modification to the display of User B to block out or otherwise modify the visual display of the hand wave of User A while the gesture is in the field of view of User B.

Figure 4:
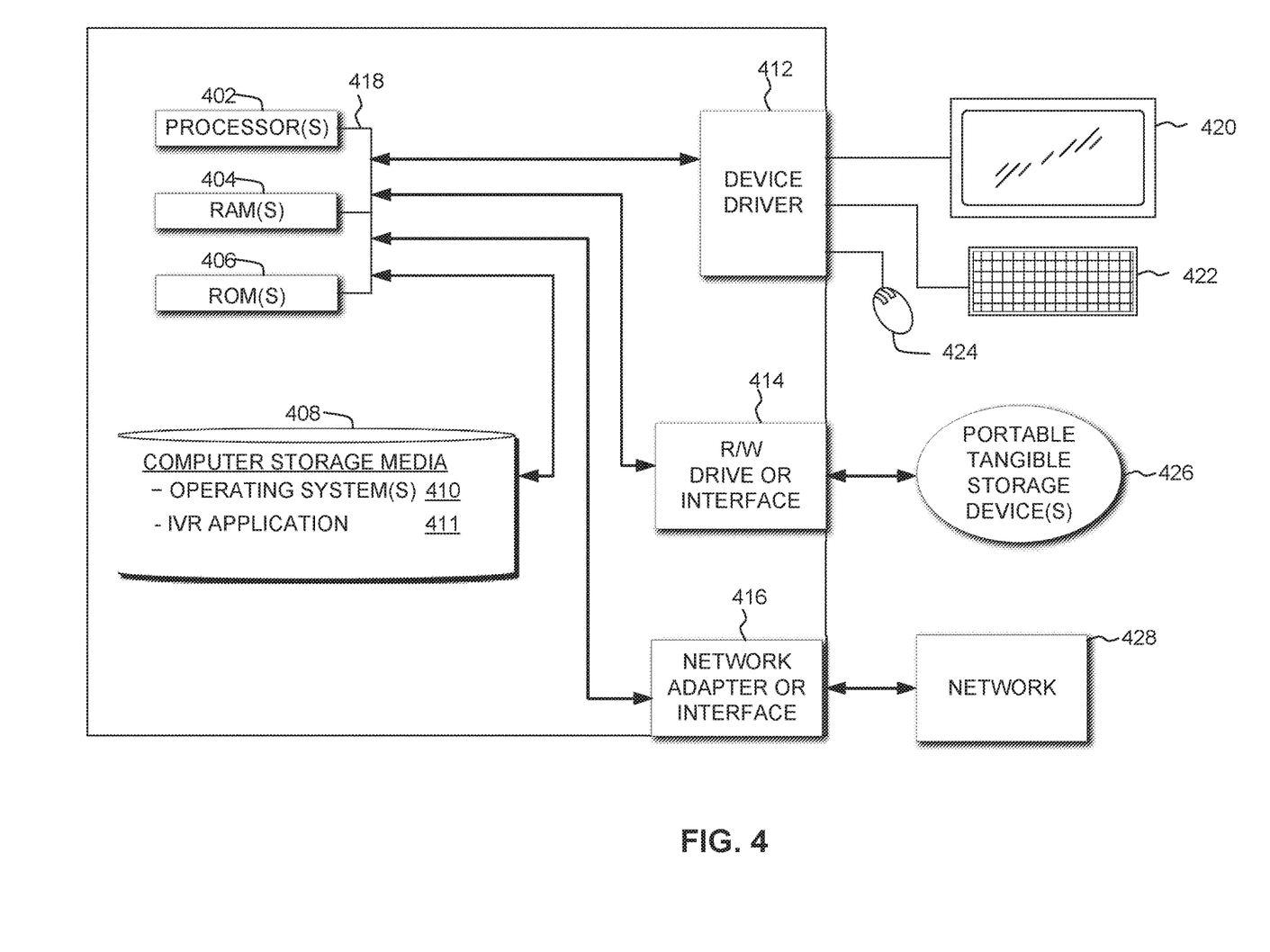
FIG. 4 depicts a block diagram of components of the server computer executing the application, in accordance with an embodiment of the present invention.

FIG. 4 depicts a block diagram of components of Server 110, user device 120, and database 130 of presentation control system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110, user device 120, and database 130 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, bias mitigation application 111, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110, user device 120, and database 130 may also include a R/W drive or interface 414 to read from and write to one or more portable computer readable storage media 426. Application programs 411 on server 110, user device 120, and database 130 may be stored on one or more of the portable computer readable storage media 426, read via the respective R/W drive or interface 414 and loaded into the respective computer readable storage media 408.

Server 110, user device 120, and database 130 may also include a network adapter or interface 416, such as a TCP/IP adapter card or wireless communication adapter (such as a 4G wireless communication adapter using OFDMA technology) for connection to a network 428. Application programs 411 on server 110, user device 120, and database 130 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110, user device 120, and database 130 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for identifying biases of one or more users during a shared augmented reality session and modifying a display associated with the one or more users of the augmented reality session in order to increase session time of the user's experience, comprising:
    detecting a first login of an augmented reality session associated with a first user profile of one or more user profiles;
    generating a first set of biases associated with the first user, based on a first user profile;
    receiving visual data from a device associated with the first user profile;
    generating a masked overlay for display to the first user based on the received visual data and the first set of biases;
    displaying the masked overlay, wherein the masked overlay blocks portions of the augmented reality session associated with the first user based on the first set of biases;
    receiving a second login of the augmented reality session associated with a second user profile of the one or more user profiles;
    generating a second set of biases associated with the second user;
    generating a heat map based on the first set of biases and the second set of biases;
    in response to analyzing the generated heat map, calculating a positivity score;
    monitoring for changes in the first set of biases and second set of biases; and
    modifying the masked overlay for display to the first user based on the monitored changes in the first set of biases and second set of biases.

2. The method of claim 1, wherein the session time includes an associated positivity score, wherein the positivity score being based on one or more of:
    time spent in session; and
    matching biases between the first set of biases and the second set of biases above a threshold or below a threshold.

3. The method of claim 1, wherein detecting a first login further comprises:
    receiving user input;
    receiving social media posts; and
    datamining social media metadata.

4. The method of claim 1, wherein the first set of bias is based on datamined social media metadata associated with the first user profile.

5. The method of claim 1, wherein the received visual data is via a first augmented reality session, the first augmented reality session further comprising:
    a camera;
    a display;
    augmented reality device; or
    a virtual reality device.

6. The method of claim 1, wherein the masked overlay further comprises:
    visual augmentations;
    shading augmentation;
    object highlights; or
    object labels.

7. A computer program product for identifying biases of one or more users during a shared augmented reality session and modifying a display associated with the one or more users of the augmented reality session in order to increase session time of the user's experience, the computer program product comprising:
    one or more computer-readable storage media and program instructions stored on the one or more computer-readable storage media, the program instructions comprising:
    instructions to detect a first login of an augmented reality session associated with a first user profile of one or more user profiles;
    instructions to generate a first set of biases associated with the first user, based on a first user profile;
    instructions to receive visual data from a device associated with the first user profile;
    instructions to generate a masked overlay for display to the first user based on the received visual data and the first set of biases;
    instructions to display the masked overlay, wherein the masked overlay blocks portions of the augmented reality session associated with the first user based on the first set of biases;

instructions to receive a second login of the augmented reality session associated with a second user profile of the one or more user profiles;
instructions to generate a second set of biases associated with the second user;
instructions to generate a heat map based on the first set of biases and the second set of biases;
in response to instructions to analyze the generated heat map, calculating a positivity score;
instructions to monitor for changes in the first set of biases and second set of biases; and
instructions to modify the masked overlay for display to the first user based on the monitored changes in the first set of biases and second set of biases.

8. The computer program product of claim 7, wherein the session time includes an associated positivity score, wherein the positivity score being based on one or more of:
    time spent in session; and
    matching biases between the first set of biases and the second set of biases above a threshold or below a threshold.

9. The computer program product of claim 7, wherein detecting a first login further comprises:
    receiving user input;
    receiving social media posts; and
    datamining social media metadata.

10. The computer program product of claim 7, wherein the first set of bias is based on datamined social media metadata associated with the first user profile.

11. The computer program product of claim 7, wherein the received visual data is via a first augmented reality session, the first augmented reality session further comprising:
    a camera;
    a display;
    augmented reality device; or
    a virtual reality device.

12. The computer program product of claim 7, wherein the masked overlay further comprises:
    visual augmentations;
    shading augmentation;
    object highlights; or
    object labels.

13. A computer system for identifying biases of one or more users during a shared augmented reality session and modifying a display associated with the one or more users of the augmented reality session in order to increase session time of the user's experience, the computer system comprising:
    one or more computer processors;
    one or more computer-readable storage media;
    program instructions stored on the computer-readable storage media for execution by at least one of the one or more processors, the program instructions comprising
    instructions to detect a first login of an augmented reality session associated with a first user profile of one or more user profiles;
    instructions to generate a first set of biases associated with the first user, based on a first user profile;
    instructions to receive visual data from a device associated with the first user profile;
    instructions to generate a masked overlay for display to the first user based on the received visual data and the first set of biases;
    instructions to display the masked overlay, wherein the masked overlay blocks portions of the augmented reality session associated with the first user based on the first set of biases;
    instructions to receive a second login of the augmented reality session associated with a second user profile of the one or more user profiles;
    instructions to generate a second set of biases associated with the second user;
    instructions to generate a heat map based on the first set of biases and the second set of biases;
    in response to instructions to analyze the generated heat map, calculating a positivity score;
    instructions to monitor for changes in the first set of biases and second set of biases; and
    instructions to modify the masked overlay for display to the first user based on the monitored changes in the first set of biases and second set of biases.

14. The computer system of claim 13, wherein the session time includes an associated positivity score, wherein the positivity score being based on one or more of:
    time spent in session; and
    matching biases between the first set of biases and the second set of biases above a threshold or below a threshold.

15. The computer system of claim 13, wherein detecting a first login further comprises:
    receiving user input;
    receiving social media posts; and
    datamining social media metadata.

16. The computer system of claim 13, wherein the first set of bias is based on datamined social media metadata associated with the first user profile.

17. The computer system of claim 13, wherein the received visual data is via a first augmented reality session, the first augmented reality session further comprising:
    a camera;
    a display;
    augmented reality device; or
    a virtual reality device.

18. The computer system of claim 13, wherein the masked overlay further comprises:
    visual augmentations;
    shading augmentation;
    object highlights;
    or object labels.

* * * * *